US012743422B2

United States Patent
(12) United States Patent
Glasbergen et al.

(10) Patent No.: US 12,743,422 B2
(45) Date of Patent: Sep. 22, 2026

(54) MECHANISMS FOR SELECTING QUERY PLANS

(71) Applicant: Salesforce, Inc., San Francisco, CA (US)

(72) Inventors: Bradley Glasbergen, Squamish (CA); Prateek Swamy, Livermore, CA (US); Yi Xia, Los Angeles, CA (US); Lars Hofhansl, Orinda, CA (US)

(73) Assignee: Salesforce, Inc., San Francisco, CA (US)

( * ) Notice: Subject to any disclaimer, the term of this patent is extended or adjusted under 35 U.S.C. 154(b) by 14 days.

(21) Appl. No.: 18/963,097

(22) Filed: Nov. 27, 2024

(65) Prior Publication Data

US 2026/0147758 A1 May 28, 2026

(51) Int. Cl.
*G06F 16/2453* (2019.01)

(52) U.S. Cl.
CPC .............................. *G06F 16/24542* (2019.01)

(58) Field of Classification Search
CPC ................................................ G06F 16/24542
See application file for complete search history.

(56) References Cited

U.S. PATENT DOCUMENTS 7,716,215 B2 5/2010 Lohman et al.
7,945,557 B2 5/2011 Cheng et al.
9,262,477 B1 * 2/2016 Gu .................... G06F 16/24542
2004/0078300 A1 * 4/2004 Smith ................ G06Q 30/0601 705/26.1
2008/0010240 A1 * 1/2008 Zait ................... G06F 16/24542
2009/0327242 A1 * 12/2009 Brown .............. G06F 16/24549
2015/0339347 A1 * 11/2015 Wiener ............ G06F 16/24542 707/718
2017/0300536 A1 * 10/2017 Gupta .............. G06F 16/24545

(Continued)

OTHER PUBLICATIONS

"Why is a query with LIMIT returning results in a different order as the same query without limit?", https://www.reddit.com/r/PostgreSQL/comments/ni2l9u/why_is_a_query_with_limit_returning_results_in_a/, 2021 (Year: 2021).*

(Continued)

*Primary Examiner* — Apu M Mofiz
*Assistant Examiner* — Farhad Agharahimi
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to determining whether to utilize an alternative query plan for a subsequent execution of a database query. A computer system accesses a trace record detailing an execution of the database query in accordance with a first query plan selected by a query optimizer. The computer system may determine, based on the trace record, whether the execution of the database query satisfies a set of performance criteria. In response to determining that the execution of the database query does not satisfy the set of performance criteria, the computer system may determine whether one or more alternative query plans for the query include a second query plan that is predicted to be more performant than the first query plan. The computer system may provide an instruction to utilize the second query plan in place of the first query plan for the subsequent execution of the database query.

20 Claims, 9 Drawing Sheets

(56) References Cited

U.S. PATENT DOCUMENTS

| | | | | |
|---|---|---|---|---|
| 2019/0384844 | A1* | 12/2019 | Ding | G06F 16/24539 |
| 2020/0272667 | A1* | 8/2020 | Ding | G06N 20/00 |
| 2025/0103572 | A1* | 3/2025 | Loring | G06F 16/2219 |

OTHER PUBLICATIONS

"One query—one database—different execution plan for different users", https://forums.oracle.com/ords/apexds/post/one-query-one-database-different-execution-plan-for-differe-0430, Dec. 6, 2013 (Year: 2013).*

"Sort-Limit Optimization in AQL", https://arangodb.com/2019/03/sort-limit-optimization-aql/, Mar. 7, 2019 (Year: 2019).*

"Query Store is enabled by default in SQL Server 2022", David Pless, https://www.microsoft.com/en-us/sql-server/blog/2022/08/18/query-store-is-enabled-by-default-in-sql-server-2022/, Aug. 18, 2022 (Year: 2022).*

* cited by examiner

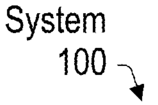
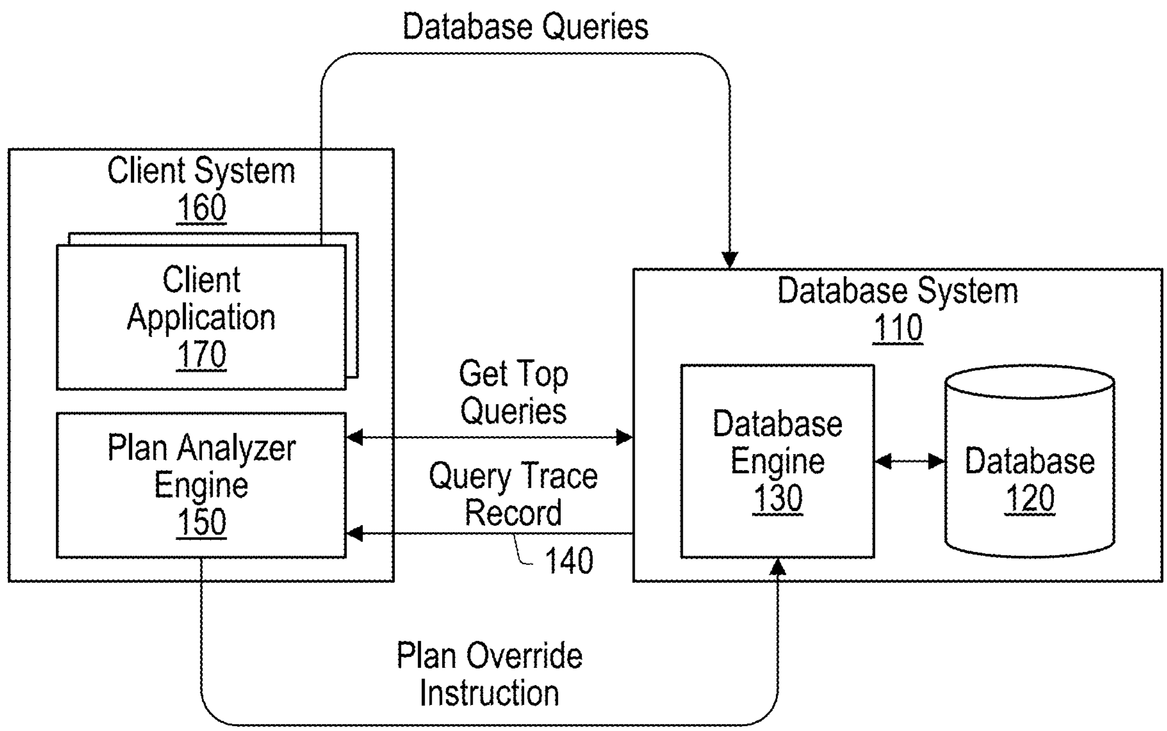
FIG. 1B

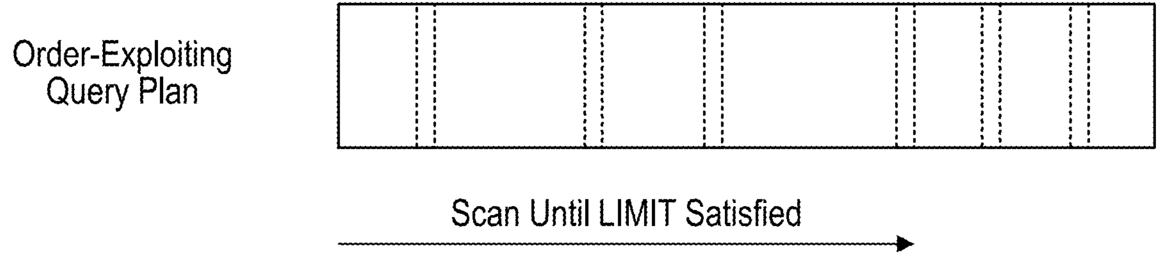
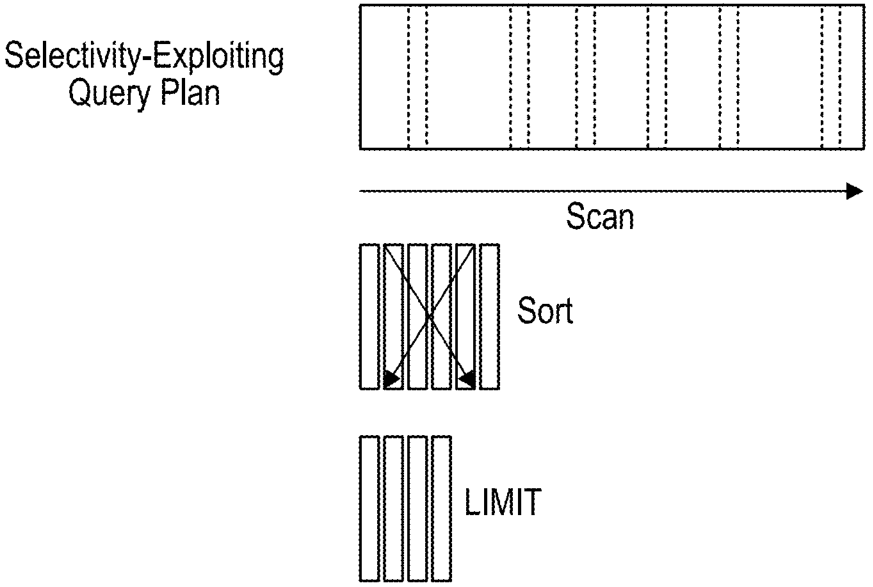
FIG. 5

Accessing Set Of Trace Records Having Query Information Detailing Execution Of Database Query In Accordance With First Query Plan Selected By Query Optimizer
610

Determining, Based On Set Of Trace Records, Whether Execution Of Database Query Satisfies Set Of Performance Criteria
620

In Response To Determining That Execution Of Database Query Does Not Satisfy Set Of Performance Criteria, Determining, Based On At Least Portion Of Query Information, That One Or More Alternative Query Plans Include Second Query Plan That Is Predicted To Be More Performant Than First Query Plan
630

Providing Instruction To Utilize Second Query Plan In Place Of First Query Plan For Subsequent Execution Of Database Query
640

Accessing Set Of Trace Records Having Query Information Detailing Execution Of Database Query In Accordance With First Query Plan Selected By Query Optimizer
710

Determining, Based On At Least Portion Of Query Information, Whether One Or More Alternative Query Plans Include Query Plan That Is Predicted To Be More Performant Than First Query Plan
720

In Response To Determining That One Or More Alternative Query Plans Include Second Query Plan That Is Predicted To Be More Performant Than First Query Plan, Providing Instruction To Utilize Second Query Plan In Place Of First Query Plan For Subsequent Execution Of Database Query
730

FIG. 7

MECHANISMS FOR SELECTING QUERY PLANS

BACKGROUND

Technical Field

This disclosure relates generally to database systems and, more specifically, to various mechanisms for selecting query plans for database queries.

Description of the Related Art

Enterprises routinely implement database management systems (or, simply "database systems") that enable users to store a collection of information in an organized manner that can be efficiently accessed and manipulated. A database system can implement any of a variety of different types of databases to store information, such as a relational database, a non-relational database, etc. During operation, a database system receives requests from users via applications or from other systems, such as another database system, to process database queries against a database of the database system. It may be possible to execute a query using several different approaches. For example, a query requesting a join of tables A, B, and C may be executed as 1) a join of A and B followed by a join of the result and C or 2) a join of B and C followed by a join of A and the result. Accordingly, the database system may select a query execution plan for a database query and execute the database query in accordance with the selected plan.

BRIEF DESCRIPTION OF THE DRAWINGS

FIGS. 1A and 1B are block diagrams illustrating different embodiments of a system that is capable of determining whether to use an alternative query plan for a subsequent execution of a database query.

FIG. 5 is a block diagram illustrating one example scenario in which an alternative query plan may be selected to override another query plan.

FIGS. 6 and 7 are flow diagrams illustrating example methods pertaining to determining whether to use an alternative query plan for a subsequent execution of a database query.

DETAILED DESCRIPTION

Figure 1A:
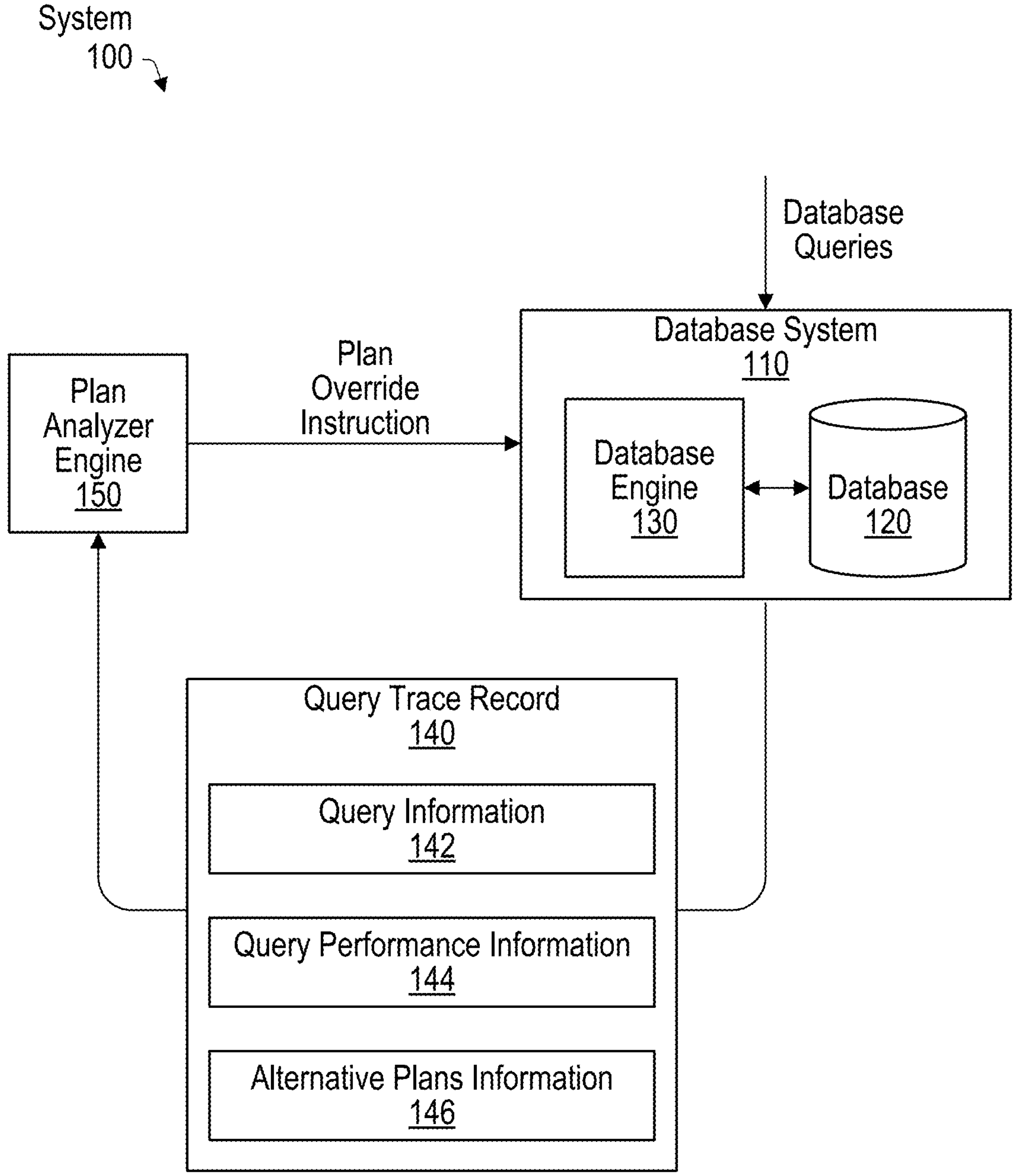

There are often multiple ways to execute a database query. Modern database systems usually employ a query optimizer that receives a parsed query and evaluates different execution plans (also referred to as "query plans") to determine a plan for executing the database query. This evaluation by the query optimizer can involve assigning scores to each query plan based on estimated computational and storage costs and then selecting the plan having the best score. But the query optimizer sometimes selects a plan that performs poorly. This may be attributable to the fact that, in some implementations, various cost metrics assessed by the query optimizer can include incorrect information. For example, statistics maintained for a table (or a column) may be stale or missing.

One approach to solving this problem would be to collect and manage accurate statistics so that the query optimizer can assign accurate scores to the evaluated query plans. But certain systems implement a multi-tenant architecture in which multiple tenants can share a database and thus store data in the same database. These tenants may store different data and also have different needs. Accordingly, to maintain accurate statistics, the system would have to collect per-tenant statistics for each tenanted table, increasing the maintenance burden on the system. To reduce the maintenance burden, the system may use the same statistics for different tenants, or even different databases, that roughly approximate the true statistics of the data. The tradeoff for the maintainability improvement is that the statistics can become inaccurate over time since the statistics may not be regularly updated.

When the statistics are inaccurate, the optimizer may choose a query plan that performs poorly because operations that it predicted would complete quickly—given the statistics—are instead slow to complete. Furthermore, there are often values that are passed in for a query that are not known to or considered by the optimizer during the query planning phase. For example, a sort-limit query involves a limit value that determines the number of tuples to include in the query's result. This limit value may not be known to the optimizer when it is selecting a plan and thus, in certain cases, the optimizer selects a poorly-performing plan. Accordingly, due to insufficient and/or inaccurate information, the optimizer can sometimes choose the wrong plan. The present disclosure addresses, among other things, the technical problem of how to address (or prevent) cases in which the query optimizer selects a poorly-performing plan.

In various embodiments described below, a system implements a database system and a plan analyzer engine that evaluates the execution of a query to determine whether to override the query plan used to process the query with an alternative plan. When a query is received by the database system, the database system may consider multiple query plans for executing the query and select one of them to implement. In some cases (e.g., when the database system is processing a certain type of database query), the database system flags one or more of the non-selected query plans for further consideration. Accordingly, in various embodiments, when the query is executed, the database system outputs a trace record that describes the query (e.g., its input parameter values) and its execution performance in detail (e.g., the number of rows that were matched by a filter for a particular step of the selected query plan) along with the one or more alternative query plans.

The plan analyzer engine consumes the trace record and may determine, based on the trace record, whether the query's performance warrants intervention—that is, the plan analyzer engine may determine whether the query performed poorly under the plan used to execute the query. For example, if the query's execution timed out, then the query plan may be considered a poorly performing query plan for that execution. If that query's plan performance merits an override, then, in various embodiments, the plan analyzer engine determine which (if any) of the alternative plans identified in the trace record is potentially better. The plan analyzer engine may leverage information that was not used or known by the database system during the query planning phase. For example, the plan analyzer engine consider the number of rows that were filtered out during a particular step of the used query plan and also a limit value that was passed when executing the query. The plan analyzer engine may use heuristics or a machine learning model to determine, based on the trace record, whether an alternative plan is potentially better than the used query plan. If there is a potentially better alternative plan, then the plan analyzer may present it to a user or communicate it to the database system, which adjusts its plan selection should the same query arrive in the future.

These techniques may be advantageous over prior approaches as these techniques allow for a query plan selected by a database system (particularly, a query optimizer) to be overridden when the query plan is determined to be poorly performing. By addressing cases in which the database system selects a poorly-performing plan without having to maintain accurate database statistics, developers of the database system may benefit from the maintainability improvement (as discussed above) while overcoming one or more of its tradeoffs/drawbacks. Furthermore, as discussed below, the plan analyzer engine may be implemented separately from the database engine, which may include a query optimizer, a query executor, etc. By implementing the plan analyzer engine separately, the workload associated with assessing a query's performance and any alternative plans may be shifted away from the database engine. Also, if any software bugs occur with the plan analyzer engine, these software bugs may not take down or slow down the database engine.

Turning now to FIG. 1A, a block diagram of one embodiment of a system 100 is shown. System 100 includes components that may be implemented via hardware or a combination of hardware and software. In the illustrated embodiment, system 100 includes a database system 110 and a plan analyzer engine 150. Also as shown, database system 110 includes a database 120 and a database engine 130, and database system 110 provides a query trace record 140 to plan analyzer engine 150. As further shown, query trace record 140 includes query information 142, query performance information 144, and alternative plans information 146. The illustrated embodiment may be implemented differently than shown. As an example, system 100 may be implemented as shown in FIG. 1B.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, stores, and other entities that are associated with system 100. In various embodiments, system 100 is implemented using a cloud infrastructure that is provided by a cloud provider. Accordingly, components of system 100, such as database system 110 and plan analyzer engine 150, may utilize the available cloud resources of the cloud infrastructure (e.g., compute resources, storage resources, etc.) in order to facilitate their operation. For example, software for implementing database engine 130 may be stored on a non-transitory computer-readable medium of server-based hardware included in a datacenter of the cloud provider and executed in a virtual machine hosted on the server-based hardware. In some cases, components of system 100 are implemented without the assistance of virtual machines and/or containerization. In some embodiments, system 100 is implemented utilizing a local or private infrastructure as opposed to a public cloud.

Database system 110, in various embodiments, implements database services, such as data storage, data retrieval, and data manipulation. Database system 110 may implement any suitable database system. In some embodiments, database system 110 implements a relational database management system, such as Microsoft® SQL Server, PostgreSQL®, IBM® DB2, etc. In various embodiments, database system 110 is a multi-tenant database system that allows multiple tenants to each store a respective set of data in database 120. For example, database 120 may include a first set of data belonging to a non-profit organization (a first tenant) and a set of data belonging to a company (a second tenant). In such an embodiment, database system 110 may employ various security measures to ensure that one tenant's data set is isolated from another's data set in order to prevent one tenant from accessing another tenant's data. In various embodiments, database system 110 store data in tables, indexes, etc. in database 120.

The database services of database system 110 may be provided to components that are within and/or external to system 100. For example, database system 110 may receive database queries from a client system (not shown in FIG. 1A) to perform one or more database operations for a database transaction. A database transaction, in various embodiments, is a logical unit of work (e.g., a set of database statements). For example, processing a database transaction may include executing a SELECT statement to select and return one or more rows from a table. The contents of a row may be specified in a record and thus database system 110 may return, to the client system, one or more records corresponding to the one or more rows. The queries that are received by database system 110 may be expressed using structured query language (SQL) or another query declarative language.

Database 120, in various embodiments, is a collection of information that is organized in a manner that allows for access, storage, and/or manipulation of that information. Database 120 may include supporting software (e.g., storage servers) that enables database engine 130 to carry out operations (e.g., accessing, storing, etc.) on the information stored at database 120. In various embodiments, database 120 is implemented using storage devices that are connected together on a network (e.g., a storage attached network (SAN)) and configured to redundantly store information in order to prevent data loss. The storage devices may store data persistently and thus database 120 may serve as a persistent storage for system 100. Further, as discussed, components of system 100 may utilize the cloud resources of a cloud infrastructure and thus data of database 120 may be stored using a storage service provided by a cloud provider (e.g., Amazon S3®). Also, in various embodiments, data that is written to database 120 by a database server is accessible to other database servers when database engine 130 implements a multi-server configuration.

Database engine 130, in various embodiments, is software that is executable to provide the database services of database system 110. Database engine 130 may thus receive database queries (e.g., a SQL SELECT statement) as part of database transactions and process them. To process a query, database engine 130 may execute a query plan that defines a series of steps to be executed in order to implement that query. In some cases, database engine 130 may generate one or more query plans and execute one of them within a single execution flow (e.g., triggered by a request to execute a query). In other cases, database engine 130 may receive a request to generate one or more query plans for a query and separately receive a request to execute that query with certain parameter values in accordance with one of the query plans. The generation and selection of a query plan for a database query is discussed in greater detail with respect to FIG. 2 As a part of preparing a given query plan for execution, database engine 130 may access a definition for that query plan (e.g., from database 120), compile it into an executable form, and then store it in a plan cache accessible to database engine 130. An example plan cache is discussed in greater detail with respect to FIG. 4. In response to a request to execute the query, database engine 130 may retrieve and execute the compiled form of the query plan. As part of the process of executing a query, in various embodiments, database engine 130 (or a different component of system 100) may generate query trace record 140 detailing the execution of that query.

Query trace record 140, in various embodiments, is a record or log that captures details of a particular query's execution by database system 110. Accordingly, query trace record 140 may include information about the query itself, the steps that were taken to execute the query, and how resources (e.g., CPU and memory) were used. This information may assist database administrators and developers in understanding the performance of the query, allowing them to troubleshoot issues. In various embodiments, query trace records 140 are generated for only a subset of queries executed by database system 110. For example, query trace record 140 may be generated for a query when database engine 130 has difficulty choosing between multiple query plans. As another example, query trace record 140 may be generated for a longer-running query whose execution exceeds a defined amount of time. In some embodiments, query trace record 140 is generated in response to database system 110 receiving an EXPLAIN ANALYZE command from a client system. In other embodiments, query trace records 140 are generated for every query executed by database system 110. As shown, query trace record 140 includes query information 142, query performance information 144, and alternative plans information 146.

Query information 142, in various embodiments, provides various details pertaining to a query. For example, query information 142 may specify the query text (the SQL statement) that was executed, query parameter values used during the execution (e.g., in the case that the query was parameterized using prepared statements), and query hints/directives that influenced the query plan used. In various embodiments, query information 142 also identifies the query plan that was used in the execution of the query, which may include how tables were scanned (e.g., sequential scan, index scan, etc.), join methods used (e.g., hash join), and other operations such as sorting or aggregating—query information 142 may thus describe the steps that were taken by database system 110 to execute the query. Query information 142 may also provide cost estimates for the steps/nodes of the query plan, such as a startup cost (the estimated time before the first row is produced), a total cost (the estimated time to produce all rows), and the estimated number of rows expected from each step. Query information 142 may also provide other details, such as optimizations that were applied to the query (e.g., predicate pushdown or query rewriting), a username or session ID associated with the query that indicates which user or application requested execution of the query, and trace flags.

Query performance information 144, in various embodiments, provides various details pertaining to a query's execution performance. For example, query performance information 144 may identify the total time taken to execute the query, the processing time consumed by the CPU to execute the query, the amount of memory allocated or consumed during the query's execution, the number of read or write operations that were performed on disk, and the amount of network traffic that was generated by the query's execution. In various embodiments, query performance information 144 identifies performance details for each step of the query plan that was used in the execution of the query. For example, query performance information 144 may identify, for each step, its actual startup cost, its actual total cost, and the actual number of rows returned or processed by that step. For filtering steps, query performance information 144 may identify the number of rows that were discarded. Query performance information 144 may also provide other details, such as errors or warnings encountered during the execution of the query and whether the query's execution timed out.

Alternative plans information 146, in various embodiments, identifies alternative query plans that can be used to execute a query. Alternative plans information 146 may specify, for an alternative query plan, the steps involved in that plan along with cost estimates for the steps (e.g., the startup cost and the total cost for each step). As discussed in more detail with respect to FIG. 2, a query optimizer of database engine 130 may consider multiple query plans that can be used to execute a query. The query optimizer may select one of those plans to execute that query and cause one or more of the other plans to be included in that query's trace record 140 as alternative query plans. In some cases, all alternative query plans are included, but in other cases, a subset of the alternative query plans are included (e.g., only those for which the query optimizer is unsure whether they will perform better or worse than the plan used to execute the query).

Plan analyzer engine 150, in various embodiments, is software executable to determine whether to utilize an alternative query plan for a subsequent execution of a query. Before plan analyzer engine 150 considers any alternative plans identified by alternative plans information 146, in various embodiments, plan analyzer engine 150 first determines whether the execution of a query satisfies one or more performance criteria. For example, plan analyzer engine 150 may determine, based on query performance information 144, whether the execution of a query timed out or exceeded a time threshold, which may be defined by a service-level agreement. If the execution of a query satisfies the one or more performance criteria, then the query may not be considered troublesome and thus plan analyzer engine 150 may not attempt to override the plan used in the execution of that query. But if the execution of that query does not satisfy the one or more performance criteria, then the query may be considered troublesome and thus plan analyzer engine 150 may determine if there is an alternative query plan that can be used instead of the selected plan used previously to execute the query.

In order to determine if there is an alternative query plan that can be used, plan analyzer engine 150 may use heuristics, machine learning models, or other approaches to identify which alternative query plan (if any) should be selected for the query based on its query trace record 140. In various embodiments, plan analyzer engine 150 considers query information that was not considered or known by database engine 130 during the query planning phase of the query. For example, a limit value can be passed in for a limit parameter of a sort-limit query. Database engine 130 may not use the limit value (as the specific value may not be known) when selecting the query plan used to execute the query. Plan analyzer engine 150, however, may evaluate the alternative plans in view of the limit value. If plan analyzer engine 150 identifies an alternative query plan that is potentially better than the plan used to execute a particular query, then plan analyzer engine 150 may issue a plan override instruction to database system 110 to override the previously-used query plan with the alternative plan. Accordingly, next time that the query is received by database system 110, database engine 130 may execute the query plan according to the alternative plan.

Turning now to FIG. 1B, a block diagram of one embodiment of system 100 is shown. In the illustrated embodiment, system 100 includes database system 110 and a client system 160. Also as shown, database system 110 include database 120 and database engine 130, and client system 160 includes plan analyzer engine 150 and client application(s) 170. System 100 may be implemented differently—e.g., as shown in FIG. 1A.

Client system 160, in various embodiments, is a system that facilitates the execution of various client applications 170 that perform various functions and tasks, including interacting with database system 110 to access and store data. In various embodiments, client system 160 is software executable on hardware, while in some embodiments, it encompasses hardware and software. Examples of client applications 170 that can be implemented by client system 160 include a CRM application, a content streaming application, an email application, and a tenant-provided application (as opposed to an application provided by a provider of system 100). A client application 170 may provide services to multiple tenants over a wide-area network, such as the Internet, and may be hosted on a cloud infrastructure.

In various embodiments, client system 160 interacts with database system 110 to enable users of system 100 to store and access their data. As an example, a client application 170 may present a user interface to a user that allows the user to request and/or update records stored in database 120. Accordingly, when a user issues a request (e.g., by selecting a save option in the interface), that client application 170 may establish a database connection with database system 110 and issue one or more database queries. As database system 110 executes received queries, in various embodiments, database system 110 tracks metrics about the queries. As an example, database system 110 may track which queries consume the most resources (e.g., queries with the highest CPU usage) and which queries run the longest. This information may be leveraged in determining when to generate query trace records 140 so that alternative query plans can be evaluated.

In various embodiments, query trace records 140 are automatically generated when one or more conditions are met (e.g., when a query becomes a long-running query, when database engine 130 is unsure whether an alternative query plan is potentially better, etc.). But in some embodiments, instead of automatically generating query trace records 140 in this manner, plan analyzer engine 150 may request that query trace records 140 be generated by database system 110 for certain queries. In particular, plan analyzer engine 150 may periodically issue a request to database system 110 to identify queries that meet particular criteria. As shown for example, plan analyzer engine 150 may request the top queries (e.g., the top five queries) that exhibit a particular characteristic (e.g., have the highest CPU usage). These queries may be more likely to be poorly-performing queries.

For each query that is identified by database system 110, in various embodiments, plan analyzer engine 150 requests database system 110 to identify whether that query has any viable alternative query plans that should be considered. Database system 110 may maintain a list of alternative plans for a query—this list may not contain all of the query plans considered during query planning but only those plans that database system 110 has trouble choosing between. If an alternative query plan exists for a query, then, in various embodiments, plan analyzer engine 150 causes database system 110 to execute that query and return a query trace record 140. For example, plan analyzer engine 150 may issue an EXPLAIN ANALYZE statement to database system 110 to execute a query. Accordingly, plan analyzer engine 150 may obtain query trace records 140 from database system 110 upon request and thereafter analyze them to determine whether to issue plan override instructions.

Plan analyzer engine 150, in various embodiments, executes (e.g., as a daemon) within the context of a client application 170. Building plan analyzer engine 150 into the application's context offers benefits over other database-engine external approaches. For example, a client application 170 may know the database schema (including the tables and custom indexes) and have a direct connection to database system 110 to obtain execution query trace records 140 and deploy plan overrides. Plan analyzer engine 150 may leverage the schema knowledge and the direct connection to database system 110. Moreover, plan analyzer engine 150 may benefit from the application's infrastructure and scalability characteristics.

Figure 2:
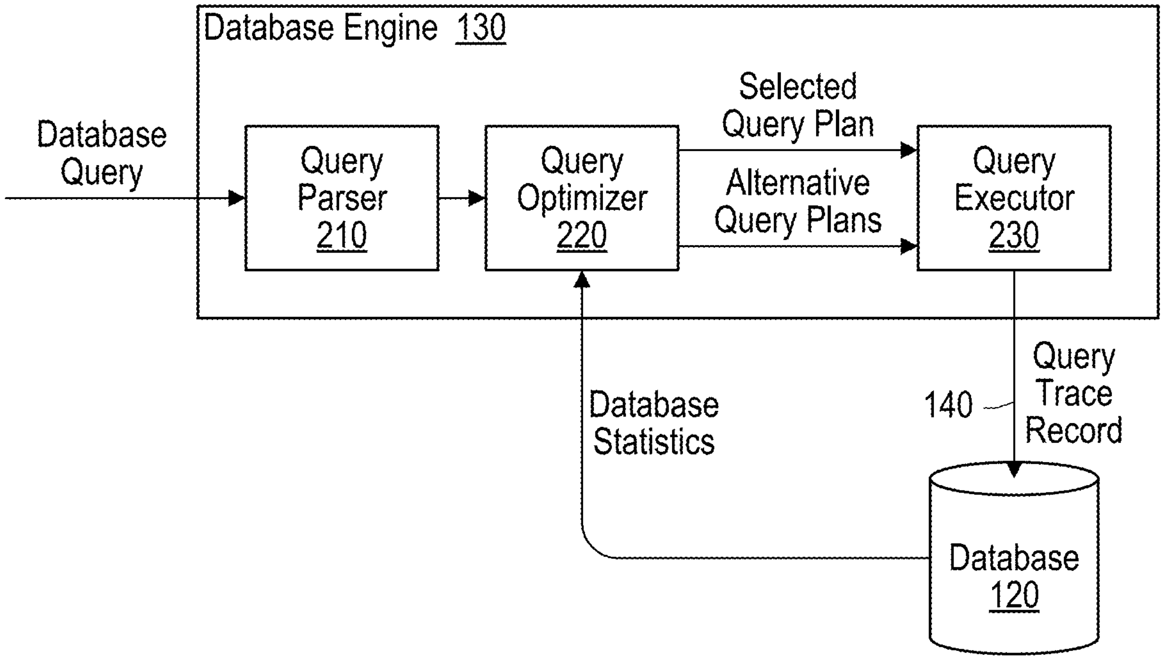
FIG. 2 is a block diagram illustrating one embodiment of a database engine capable of producing a query trace record that details an execution of a database query.

Turning now to FIG. 2, a block diagram of one embodiment of database engine 130 is shown. In the illustrated embodiment, database engine 130 includes a query parser 210, a query optimizer 220, and a query executor 230. As further shown, database engine 130 interacts with database 120. The illustrated embodiment may be implemented differently than shown. For example, database engine 130 may include a query planner, as discussed below.

When a query is received by database engine 130, it may first be parsed by query parser 210. Query parser 210, in various embodiments, parses a received query, which may include performing a syntax analysis of the clauses within the query and assembling a data structure (e.g., an expression tree) that can be processed by query optimizer 220. Query parser 210 may separate any constraints from the received query and attempt to flatten the query if it includes subqueries. This flattening may include merging a query and a subquery into a single query as well as merging together constraints if multiple constraints have been specified for the query and its subquery. Also, as part of the parsing, the query parser may perform one or more checks, such as a syntax check to check whether the received query breaks a database rule, a semantic check to check whether the database objects specified in the query exist, etc. The assembled data structure is provided as an input into query optimizer 220.

Query optimizer 220, in various embodiments, evaluates one or more query plans for a query and selects one to implement for the query, where the query plan selection may be based on predefined rules, algorithms, and/or cost estimates (e.g., processing time). Query optimizer 220 may generate the query plans for the query, where each query plan may involve a different combination of steps, and assign cost estimates (e.g., a startup cost, a total cost, and the number of rows expected from each step) to those query plans. In some embodiments, this process of generating query plans and assigning cost estimates is separated out from query optimizer 220 and implemented by a query planner component (not shown).

Any suitable algorithm may be employed by query optimizer 220 to evaluate and select query plans. In some embodiments, query optimizer 220 utilizes a heuristic algorithm in which query plans are assessed based on a set of rules. In various embodiments, optimizer 220 utilizes a cost-based algorithm in which optimizer 220 performs a cost analysis that includes assigning scores to query plans based on their estimated processor consumption, their estimated memory consumption, their estimated execution time (e.g., their startup cost), etc. These estimates may be based on database statistics. Accordingly, as shown, query optimizer 220 accesses database statistics from database 120 and leverages them to make decisions about the most efficient way to execute a query.

The accessed database statistics may include table statistics such as the total number of rows in a given table, the number of distinct values in a column (which might help in estimating the selectivity of a query), data distributions in columns, etc. The database statistics may also include index statistics such as the number of unique values in an index, the number of levels in a B-tree index, the size of the index in pages, etc. The database statistics may further include resource costs such as the cost of reading or writing a page from/to disk, the processing cost of performing filtering, joining, or sorting operations, etc. These database statistics may allow query optimizer 220 to estimate the cost of different query plans. Accordingly, based on scores assigned to those different query plans, query optimizer 220 may select the query plan with the best score and instruct query executor 230 to implement the query plan.

In various cases, when there are multiple query plans for a query, query optimizer 220 may be unsure whether an alternative query plan is better or worse than the plan that it selected. This uncertainty may occur for various reasons. In some cases, the database statistics may be estimates that are periodically updated as opposed to real-time statistics. As a result, the costs assigned to different query plans may become less accurate over time as the statistics become less accurate as database 120 changes. As such, if an alternative query plan has a score that is close to the score of the selected query plan (e.g., within a defined threshold), then there may be a reasonable chance that the alternative query plan performs better than the selected query plan. In some cases, certain information is not known to query optimizer 220 when it generates query plans, which can lead to uncertainty. For example, when the same query will be executed multiple times with potentially different values, a PREPARE statement may be used to cause query optimizer 220 to generate query plans in preparation for the actual query. The statement may use placeholders instead of values. (The values may be provided separately at execution time and bound to the placeholders—thus these values may be referred to as bind parameters). Because query optimizer 220 may not know what the actual values will be and the values may affect which query plan performs better, there may be a reasonable chance that the alternative query plan performs better than the selected query plan.

Accordingly, when there is uncertainty regarding whether an alternative query plan will perform better than the selected query plan, query optimizer 220 may flag that alternative query plan for analysis by plan analyzer engine 150. In various embodiments, query optimizer 220 identifies the alternative query plan to query executor 230 (or a different component) so that it is included in the associated query's trace record 140. In some embodiments, query optimizer 220 may flag an alternative query plan based on a developer's knowledge. In particular, from past production issues or tenant bugs, developers of database engine 130 may know the query patterns for which query optimizer 220 often chooses a poorly-performing plan. Thus, query optimizer 220 may be hardcoded to flag alternative query plans when those types of queries are received by database engine 130.

Once a query plan has been selected by query optimizer 220, in various embodiments, query executor 230 executes the selected plan. Accordingly, query executor 230 may perform the various actions of the plan, which may include accessing one or more data tables, indexes, and/or other database objects stored in database 120. Query executor 230 may then return any results to service the query implemented by the selected query plan. As a part of that process, query executor 230 may produce a query trace record 140 for that query, where that query trace record 140 identifies any flagged alternative query plans, which may be only a subset of all the alternative query plans for that query. Query optimizer 220 may thus identify particular queries for further plan analysis and cause query executor 230 to produce traces records 140 identifying alternative query plans for those database queries. In some embodiments, a service that works in connection with query executor 230 produces trace records 140.

Figure 3:
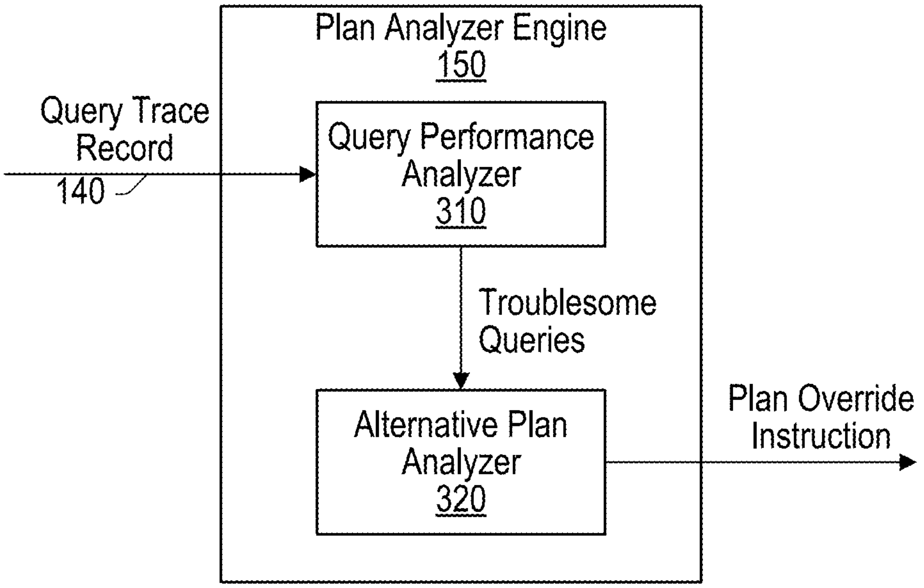
FIG. 3 is a block diagram illustrating one embodiment of a plan analyzer engine capable of consuming a query trace record and determining whether there is an alternative query plan to override another query plan.

Turning now to FIG. 3, a block diagram of one embodiment of plan analyzer engine 150 is shown. As shown, plan analyzer engine 150 includes a query performance analyzer 310 and an alternative plan analyzer 320. Plan analyzer engine 150 may be implemented differently than shown. As an example, in some embodiments, plan analyzer engine 150 may analyze the alternative query plan(s) for a query without initially determining whether the execution of that query performed poorly. Thus, plan analyzer engine 150 might not include query performance analyzer 310.

Query performance analyzer 310, in various embodiments, analyzes the execution of a query to determine whether the query's execution satisfies one or more performance criteria—that is, query performance analyzer 310 determines whether the query performed poorly under the plan used to execute the query and warrants intervention. Query performance analyzer 310 may base its analysis on query performance information 144 of a query's trace record 140. As discussed, query performance information 144 may identify the total time taken to execute the query, the processing time consumed by the CPU to execute the query, the amount of memory allocated during the query's execution, etc. The one or more performance criteria may include any of various criteria pertaining to these performance characteristics. For example, in various embodiments, if the execution of a query times out, then the plan used to execute the query is considered a poorly-performing plan. Thus, query performance analyzer 310 may determine, based on query performance information 144 of a query's trace record 140, whether that query timed out. As another example, service-level agreements may dictate that database system 110 should process queries within a certain amount of time. Thus, query performance analyzer 310 may determine whether the execution time exceeded a time threshold established by a service-level agreement. As another example, query performance analyzer 310 may determine whether the amount of memory used to process a query exceeded a threshold and whether the number of I/O operations exceeded a threshold. If a query's execution satisfies one or more assessed performance criteria, then, in various embodiments, the query's performance is considered to be acceptable and thus may not warrant intervention. If the query's execution does not satisfy the assessed performance criteria (e.g., the query timed out), then query performance analyzer 310 may instruct alternative plan analyzer 320 to analyze any alternative query plans for that query.

Alternative plan analyzer 320, in various embodiments, analyzes any alternative query plans for a query to determine whether there is one that is deemed to be more performant than the selected query plan used in the previous execution of that query. Alternative plan analyzer 320 may use heuristics, machine learning models, or other approaches to identify an alternative query plan (if any) to utilize in a subsequent execution of the query instead of the previously-selected query plan. If there is an alternative query plan that is deemed more performant, than plan analyzer engine 150 may issue a plan override instruction.

Query types often have certain properties that affect whether a query plan will perform well. For example, a sort-limit query involves a limit value that determines the number of rows to return. As discussed in more detail with respect to FIG. 5, a selectivity-exploiting plan or an order-exploiting plan may be used for that query. The limit value can affect which query plan is more optimal. As the limit value increases, the selectivity-exploiting plan may become more desirable over the order-exploiting plan. Accordingly, in a heuristics approach, there may be a rule that if the limit value is greater than a certain number, then the selectivity-exploiting plan should be used. Consequently, if a query is a sort-limit query and it was executed using the order-exploiting plan, then alternative plan analyzer 320 may override using that plan with the selectivity-exploiting plan if the limit value is greater than a certain number. As such, in various embodiments, alternative plan analyzer 320 may first determine a query's type and then assess certain properties of the query using a heuristics approach that is based on the information in the query's trace record 140. For example, once alternative plan analyzer 320 knows the type of a query, it may use a configurable set of query patterns to search for particular properties in the query's execution, including input values. As discussed, different query plans may perform better than other plans depending on the set of properties exhibited by a query and its execution. Alternative plan analyzer 320 may identify a more performant query plan for a query based on the set of properties exhibited by a query and its execution. In some embodiments, a machine learning model is used that is trained based on a corpus of trace records 140 to detect patterns between properties exhibited by a query and how the query performed under a particular query plan. Accordingly, the query trace record 140 of a poorly-performing query may be used as an input with the machine learning model to identify an alternative query plan for that query.

In various embodiments, plan analyzer engine 150 issues a plan override instruction to database engine 130, where the plan override instruction identifies the alternative query plan (e.g., by plan ID, by its position in a query plan list, etc.). In some embodiments, plan analyzer engine 150 may use directives that restrict query plans considered to implement a given query. In particular, a query may be submitted that includes one or more embedded directives. As an example, a query may include a directive instructing query optimizer 220 to select a plan that includes a particular type of scan, join, etc. As such, plan analyzer engine 150 may embed, in a query, one or more directives that cause query optimizer 220 to select a particular alternative query plan. Thus, plan analyzer engine 150 may prevent query optimizer 220 from selecting a plan including, e.g., a problematic join operation. In some embodiments, plan analyzer engine 150 issues the plan override instruction as a recommendation that is presented to a user in a user interface. The user may review the alternative query plan and then either approve or reject using the plan instead of the previously-used plan. If approved, system 100 may automatically cause the alternative query plan to be used or the user may manually cause the alternative query plan to be used.

Figure 4:
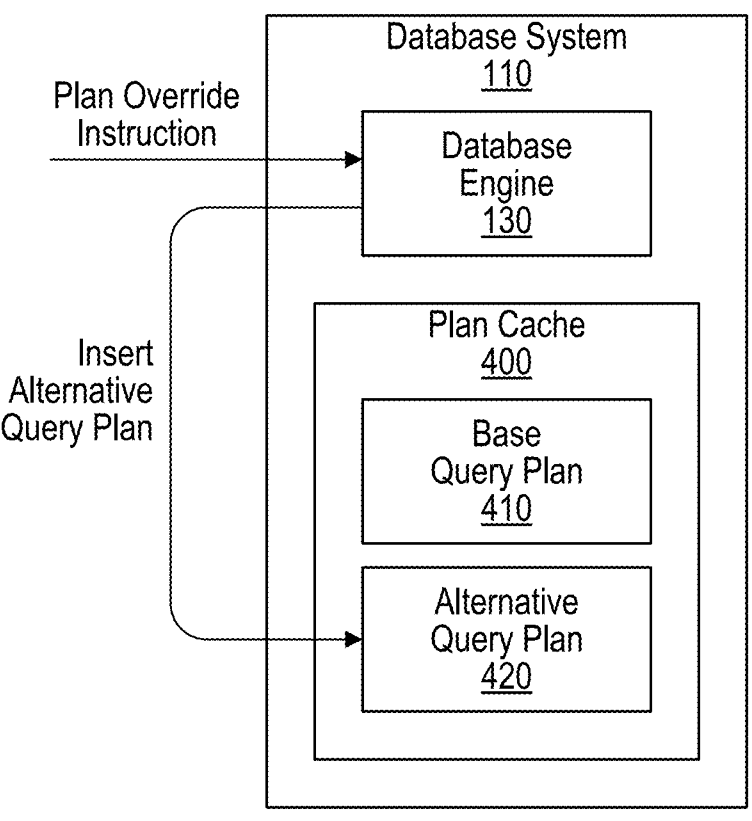
FIG. 4 is a block diagram illustrating one embodiment of a database engine inserting an alternative query plan into a plan cache in response to receiving a plan override instruction.

Turning now to FIG. 4, a block diagram of one embodiment of inserting an alternative query plan into a plan cache 400 is shown. In the illustrated embodiment, database system 110 includes database engine 130 and plan cache 400. Also as shown, plan cache 400 stores a base query plan 410 and an alternative query plan 420 inserted after database engine 130 receives a plan override instruction.

Plan cache 400, in various embodiments, is a cache structure used to store query plans for database queries. Plan cache 400 may allow database system 110 to reuse these plans for future queries that are identical or similar, which can significantly improve query performance by avoiding the need to recompile or re-optimize the query each time it is run. Accordingly, in various embodiments, after a query plan is created for a query, it is stored in plan cache 400. If the same query or a sufficiently similar one is executed again, then database engine 130 can retrieve the stored plan from plan cache 400, bypassing the query optimization step. Database engine may match queries against the cached plans using criteria, such as the exact text of the query.

Base query plan 410, in various embodiments, is a query plan that has been selected by query optimizer 220 to implement a corresponding query. As discussed, database system 110 may be a multi-tenant database system that processes queries received from multiple tenants. The tenants may issue the same or sufficiently similar queries—the tenants may issue the same query text but with different input values. In various embodiments, instead of generating and storing a query plan for each tenant for the same query, database engine 130 generates a single query plan that is used by a group of tenants for the same query. Accordingly, base query plan 410 may be the query plan used by the group. This approach may reduce the total number of query plans that are maintained and stored in plan cache 400 for a given query.

Tenants, however, may store different data and have different needs, and thus while a query plan may perform well for many of the tenants, the same query plan may perform poorly for some of the tenants. To address this issue, plan overrides may be performed on a tenant-by-tenant basis. Accordingly, the plan override instruction issued by plan analyzer engine 150 may identify one or more tenants for which to use alternative query plan 420. Database engine 130 may insert alternative query plan 420 into plan cache 400 alongside base query plan 410, as shown. Thus, if base query plan 410 performs poorly for a tenant, then base query plan 410 may be overridden by alternative query plan 420 for that particular tenant. When the query is received from a tenant associated with alternative query plan 420, database engine 130 may use alternative query plan 420; otherwise, database engine 130 may use base query plan 410. That is, a tenant may use base query plan 410 as the default plan for a query unless base query plan 410 performs poorly (e.g., it times out) for that tenant, at which point plan analyzer engine 150 may determine if there is a suitable alternative query plan and, if so, issue a plan override instruction to override base query plan 410 for that tenant.

Turning now to FIG. 5, a block diagram of one example scenario in which a query plan may be selected to override another query plan is shown. In the illustrated embodiment, there is an order-exploiting query plan and a selectivity-exploiting query plan. As further shown, the order-exploiting query plan involves a scan followed by a LIMIT operation, and the selectivity-exploiting query plan involves a scan followed by a sort followed by a LIMIT operation.

Database queries often use LIMIT clauses to reduce the number of records returned by the query. Queries with LIMIT clauses tend to use ORDER BY clauses to control the return order of the records, as otherwise records may be returned arbitrarily. When a query features both a parameterized LIMIT clause and an ORDER BY clause, it is often referred to as a "sort-limit" query. Such queries may be challenging for query optimizer 220 because it may not have access to certain criteria—LIMIT values and accurate selectivities—that determine which plan is suitable for the query.

There are at least two types of query plans that could perform well for a sort-limit query. The first type exploits the order of a table or an index to avoid blocking sort operations, thereby enabling an early execution termination. Plans of this type are referred to as "order-exploiting" query plans. As shown, an order-exploiting query plan performs a sequential scan, e.g., of a base table until a number of records has been found that satisfies the query's predicates and its LIMIT value, at which point the scan terminates and the located records may be returned. As the index in this type of plan follows the sort order requested by the query, the scan can terminate early (without performing the complete index scan) once the LIMIT value is satisfied.

The second type may use the most selective index available given the predicates in the query but incurs blocking sort-operations, which preclude an early termination. Plans of this type are referred to as "selectivity-exploiting" query plans. As shown, a selectivity-exploiting query plan performs a scan, e.g., of a portion or all of an index, sorts the records that are found, and then reduces the number of records to satisfy the LIMIT value. If the predicates are quite selective (i.e., fewer records match the predicates), then a selectivity-exploiting query plan will scan fewer records than an order-exploiting query plans. The scan performed for a selectivity-exploiting query plan cannot be terminated early as records may not be located in order during the scan.

These plans present different trade-offs. The better plan for a given query's execution depends on the LIMIT value and the selectivity of the predicates. As the LIMIT value increases and/or the selectivity of the predicates increases (i.e., fewer records match the predicates), the selectivity-exploiting plan may become increasingly better. But as the LIMIT value decreases and/or the predicates become less selective (i.e. more records match the predicates), the order-exploiting plan may become increasingly better. Since query optimizer 220 may not know the LIMIT value and/or have an accurate estimation of the selectivities of the predicates of a query, query optimizer 220 may select a plan that performs poorly. In contrast, plan analyzer engine 150 may know the LIMIT value and an accurate estimation of the selectivities of the predicates based on the query's trace record 140. Consequently, plan analyzer engine 150 may select an alternative query plan (e.g., an order-exploiting query plan) and then instruct query optimizer 220 to use that plan instead of the previously-selected query plan (e.g., a selectivity-exploiting query plan).

Turning now to FIG. 6, a flow diagram of a method 600 is shown. Method 600 is one embodiment of a method performed by a computer system (e.g., system 100) to determine whether to utilize a different query plan for a subsequent execution of a database query. Method 600 may be performed by executing a set of program instructions stored on a non-transitory computer-readable medium. Method 600 may include more or fewer steps than shown. For example, method 600 might not include step 620.

Method 600 begins in step 610 with the computer system accessing a set of trace records (e.g., one or more query trace records 140) having query information (e.g., information 142, 144, and 146) detailing an execution of the database query in accordance with a first query plan selected by a query optimizer (e.g., query optimizer 220). Those trace records may identify one or more alternative query plans for the database query that were not selected by the query optimizer, and the first query plan may be selected by the query optimizer without using at least a portion of the query information (e.g., query performance information 144). In various embodiments, the query optimizer is operable to identify particular database queries for further plan analysis and cause a query executor (e.g., query executor 230) of the computer system to produce traces records identifying alternative query plans for those database queries.

In step 620, the computer system determines, based on the set of trace records, whether the execution of the database query satisfies a set of performance criteria, which may include a criterion that the execution of the database query did not timeout or exceed a certain amount of time. In step 630, in response to determining that the execution of the database query does not satisfy the set of performance criteria, the computer system determines, based on the at least a portion of the query information, that the one or more alternative query plans include a second query plan that is predicted to be more performant than the first query plan. In various cases, the first query plan and the one or more alternative query plans are a subset of a total number of query plans considered by the query optimizer.

In step 640, the computer system provides an instruction to utilize the second query plan in place of the first query plan for the subsequent execution of the database query. In some embodiments, the instruction to utilize the second query plan instead of the first query plan is automatically provided by the computer system to the query optimizer. In some embodiments, the providing of the instruction includes presenting, in an interface, the instruction to a user (e.g., a developer) of the computer system for approval to utilize the second query plan in place of the first query plan for the subsequent execution.

The database query may be a sort-limit query, the first query plan may be a selectivity-exploiting plan, and the second query plan may be an order-exploiting plan. The execution of the database query may also be associated with a tenant of the computer system. Accordingly, subsequent executions of the database query for the tenant may utilize the second query plan while subsequent executions of the query for one or more other tenants of the computer system utilize the first query plan.

The computer system may determine, based on a different set of trace records, whether an execution of a different database query satisfies the set of performance criteria. In response to determining that the execution of the different database query satisfies the set of performance criteria, the computer system may skip determining whether there is an alternative query plan that is predicted to be more performant than a query plan that was utilized in the execution of the different database query.

Turning now to FIG. 7, a flow diagram of a method 700 is shown. Method 700 is one embodiment of a method performed by a computer system (e.g., system 100) to determine whether to utilize a different query plan for a subsequent execution of a database query. Method 700 may be performed by executing a set of program instructions stored on a non-transitory computer-readable medium. Method 700 may include more or fewer steps than shown. For example, method 700 may include a step in which the computer system determines whether the execution of the database query exceeded a threshold amount of time and thus an alternative plan may be considered.

Method 700 begins in step 710 with the computer system accessing a set of trace records (e.g., one or more query trace records 140) having query information (e.g., information 142, 144, and 146) detailing an execution of a database query in accordance with a first query plan selected by a query optimizer (e.g., query optimizer 220). Those trace records may identify one or more alternative query plans for the database query that were not selected by the query optimizer, and the first query plan may be selected by the query optimizer without using at least a portion of the query information (e.g., a limit value and/or a selectivity of one or more predicates of the database query). In some embodiments, the computer system issues a request to a database system (e.g., database system 110) to identify one or more database queries whose execution utilized at least a threshold amount of computer resources (e.g., top ten queries with the highest CPU usage). The computer system may receive a response identifying the database query and thus the accessing may be performed based on the database query being identified in the response.

In step 720, the computer system determines, based on the at least a portion of the query information, whether the one or more alternative query plans include a query plan that is predicted to be more performant than the first query plan. In some embodiments, the computer system assesses each one of the one or more alternative query plans based on a set of heuristics that utilizes a limit value and a selectivity of one or more predicates of the database query that are specified in the at least a portion of the query information. In some embodiments, the second query plan is predicted to be more performant than the first query plan based on a machine learning model trained based on trace records detailing executions of a plurality of database queries. Also, the computer system may determine, based on the set of trace records, whether the execution of the database query exceeded a threshold amount of time. As such, the determining whether the one or more alternative query plans include a query plan that is predicted to be more performant than the first query plan may be performed based on the database query exceeding the threshold amount of time.

In step 730, in response to determining that the one or more alternative query plans include a second query plan that is predicted to be more performant than the first query plan, the computer system provides an instruction to utilize the second query plan in place of the first query plan for a subsequent execution of the database query. The execution of the database query may be associated with a tenant of the computer system. Subsequent executions of the database query for the tenant may utilize the second query plan while subsequent executions of the database query for one or more other tenants of the computer system utilize the first query plan.

Exemplary Computer System

Figure 8:
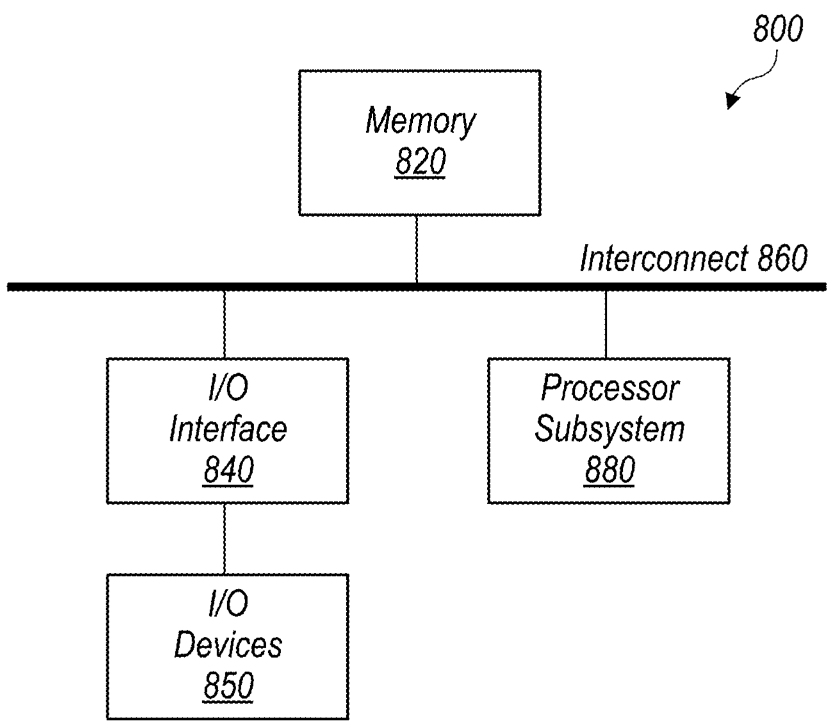
FIG. 8 is a block diagram illustrating elements of a computer system for implementing various systems described in the present disclosure, according to some embodiments.

Turning now to FIG. 8, a block diagram of an exemplary computer system 800, which may implement system 100, database system 110, database 120, and/or client system 160, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In various embodiments, program instructions that when executed implement database engine 130, plan analyzer engine 150, and/or a client application 170 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to." When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on." The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to." Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method for determining whether to utilize a different query plan for a subsequent execution of a database query, the method comprising:

accessing, by a computer system, a set of trace records generated for a prior execution of the database query in accordance with a first query plan selected by a query optimizer, wherein the set of trace records identifies:

query information detailing the prior execution of the database query; and alternative plan information that identifies one or more alternative query plans for the database query that were flagged for inclusion in the set of trace records but not selected by the query optimizer for the prior execution, and wherein the first query plan was selected by the query optimizer without using at least a portion of the query information;

determining, by the computer system based on the set of trace records, whether the prior execution of the database query satisfies a set of performance criteria;

in response to determining that the prior execution of the database query does not satisfy the set of performance criteria, the computer system determining, based on at least one runtime query parameter identified by the query information, that the one or more alternative query plans include a second query plan that is predicted to be more performant than the first query plan; and providing, by the computer system, an instruction to utilize the second query plan in place of the first query plan for the subsequent execution of the database query.

2. The method of claim 1, wherein the at least one time query parameter includes a limit value and a selectivity of one or more predicates of the database query.

3. The method of claim 1, wherein the prior execution of the database query is associated with a tenant of the computer system, and wherein subsequent executions of the database query for the tenant utilize the second query plan while subsequent executions of the database query for one or more other tenants of the computer system utilize the first query plan.

4. The method of claim 1, wherein the first query plan and the one or more alternative query plans are a subset of a total number of query plans considered by the query optimizer.

5. The method of claim 1, wherein the query optimizer is operable to identify particular database queries for further plan analysis and cause a query executor of the computer system to produce traces records identifying alternative query plans for the particular database queries.

6. The method of claim 1, wherein the instruction to utilize the second query plan instead of the first query plan is provided by the computer system to the query optimizer.

7. The method of claim 1, wherein the providing of the instruction includes presenting, in an interface, the instruction to a user of the computer system for approval to utilize the second query plan in place of the first query plan for the subsequent execution.

8. The method of claim 1, wherein the database query is a sort-limit query, the first query plan is a selectivity-exploiting plan, and the second query plan is an order-exploiting plan.

9. The method of claim 1, wherein the set of performance criteria includes a criterion that an execution of the database query did not timeout.

10. The method of claim 1, further comprising:

determining, by the computer system based on a different set of trace records, whether an execution of a different database query satisfies the set of performance criteria; and in response to determining that the execution of the different database query satisfies the set of performance criteria, the computer system skipping determining whether there is an alternative query plan that is predicted to be more performant than a query plan utilized in the execution of the different database query.

11. A non-transitory computer-readable medium having program instructions stored thereon that are capable of causing a computer system to perform operations comprising:

accessing a set of trace records generated for a prior execution of a database query in accordance with a first query plan selected by a query optimizer, wherein the set of trace records identifies:

query information detailing the prior execution of the database query; and alternative plan information that identifies one or more alternative query plans for the database query that were flagged for inclusion in the set of trace records but not selected by the query optimizer for the prior execution, and wherein the first query plan was selected by the query optimizer without using at least a portion of the query information;

determining, based on at least one runtime query parameter identified by the query information, whether the one or more alternative query plans include a query plan that is predicted to be more performant than the first query plan; and in response to determining that the one or more alternative query plans include a second query plan that is predicted to be more performant than the first query plan, providing an instruction to utilize the second query plan in place of the first query plan for a subsequent execution of the database query.

12. The non-transitory computer-readable medium of claim 11, wherein the determining whether includes:

assessing each one of the one or more alternative query plans based on a set of heuristics that utilizes a limit value and a selectivity of one or more predicates of the database query, wherein the at least one runtime query parameter includes the limit value.

13. The non-transitory computer-readable medium of claim 11, wherein the operations further comprise:

issuing a request to a database system to identify one or more database queries whose execution utilized at least a threshold amount of computer resources; and receiving, from the database system, a response identifying the database query, wherein the accessing is performed based on the database query being identified in the response.

14. The non-transitory computer-readable medium of claim 11, wherein the prior execution of the database query is associated with a tenant of the computer system, and wherein subsequent executions of the database query for the tenant utilize the second query plan while subsequent executions of the database query for one or more other tenants of the computer system utilize the first query plan.

15. The non-transitory computer-readable medium of claim 11, wherein the operations further comprise:

determining, based on the set of trace records, whether the prior execution of the database query exceeded a threshold amount of time, wherein the determining whether the one or more alternative query plans include a query plan that is predicted to be more performant than the first query plan is performed based on the database query exceeding the threshold amount of time.

16. A system, comprising:

at least one processor; and memory having program instructions stored thereon that are executable by the at least one processor to cause the system to perform operations comprising:

accessing a set of trace records outputted by a query executor of the system for a prior execution of a database query, the set of trace records having:

query information detailing the prior execution of the database query in accordance with a first query plan selected by a query optimizer of the system, and alternative plan information that identifies one or more alternative query plans for the database query that were flagged for inclusion in the set of trace records but not selected by the query optimizer for the prior execution;

determining, based on the set of trace records, whether the execution of the database query satisfies a set of performance criteria;

in response to determining that the execution of the database query does not satisfy the set of performance criteria, determining, based on at least one runtime query parameter identified by the query information, whether the one or more alternative query plans include a query plan that is predicted to be more performant than the first query plan; and in response to determining that the one or more alternative query plans include a second query plan that is predicted to be more performant than the first query plan, providing an instruction to utilize the second query plan in place of the first query plan for a subsequent execution of the database query.

17. The system of claim 16, wherein the prior execution of the database query is associated with a tenant of the system, and wherein the instruction causes subsequent executions of the database query for the tenant to utilize the second query plan but not subsequent executions of the database query for one or more other tenants of the system.

18. The system of claim 16, wherein the instruction to utilize the second query plan instead of the first query plan is provided by the system to the query optimizer.

19. The system of claim 16, wherein the second query plan is predicted to be more performant than the first query plan based on a machine learning model trained based on trace records detailing executions of a plurality of database queries.

20. The system of claim 16, wherein the operations further comprise:

determining whether an execution of a different database query satisfies the set of performance criteria; and in response to determining that the execution of the different database query satisfies the set of performance criteria, skipping determining whether there is an alternative query plan that is predicted to be more performant than a query plan utilized in the execution of the different database query.

* * * * *